United States Patent Office
3,440,233
Patented Apr. 22, 1969

3,440,233
PREPOLYMERS OF UNSATURATED HETEROCYCLIC COMPOUNDS AND ALPHA-ALKYL STYRENES AND PROCESS FOR PREPARING SAME
Roy T. Holm, Orinda, Calif., assignor to Shell Oil Company, New York, N.Y., a corporation of Delaware
No Drawing. Filed June 29, 1965, Ser. No. 468,100
Int. Cl. C08f 19/02
U.S. Cl. 260—88.1       11 Claims This invention relates to the preparation of prepolymers and to the resulting products. More particularly, the invention relates to curable prepolymers of unsaturated heterocyclic compounds and substituted-monovinyl aromatic compounds, to their use, particularly in the formation of laminated products, and to the process for preparing the prepolymers.

Specifically, the invention provides new and valuable prepolymer compositions which are stable at room temperature but can be cured at elevated temperatures, which composition comprises (1) a polymerized compound containing at least one cyclic structure containing an ethylenic group adjacent to a heteroatom and one other ethylenic group, and preferably a compound possessing a plurality of dihydropyran rings and (2) a substituted-monovinyl aromatic compound, preferably a side chain-substituted styrene and more preferably an alpha-alkyl styrene.

Another embodiment of the present invention provides a process for preparing prepolymer compositions of varying viscosity which are stable at room temperature which comprises heating (1) the aforementioned heterocyclic compound and (2) a substituted-monovinyl aromatic compound, preferably a side chain-substituted styrene and more preferably an alpha-alkyl styrene in the presence of a salt of an inorganic acid, the anion portion of which contains at least two dissimilar elements and preferably an amine salt of one of the aforementioned acids.

As a special embodiment, the invention provides a process for making prepolymer compositions of varying viscosities which are stable at room temperature which comprises heating the above-described compound containing the cyclic structure containing an ethylenic group adjacent to a heteroatom with an alpha-substituted styrene in the presence of an amine salt of an inorganic acid as described above wherein the amine portion has pKb value of less than 9.5, until the desired viscosity has been obtained, and then cooling the mixture to room temperature.

Homopolymers of the above-described compounds containing the cyclic structure containing an ethylenic group adjacent to a heteroatom and processes for preparing such homopolymers have been described before. Such polymers are, in general, stable at room temperature, exhibit controllable viscosities and cure to products having good hardness and heat resistance. However, it is highly desirable to prepare prepolymers which not only have these desirable properties but also are more economically attractive.

It has been discovered quite unexpectedly that when polymers of compounds containing cyclic structure having an ethylenic group adjacent to a heteroatom are modified with certain side-chain substituted monovinyl aromatic compounds, such prepolymers are not only stable at room temperature, but also cure at elevated temperatures to produce resins, particularly when used in laminates, which have improved physical properties (or at least as good) with a considerable cost reduction.

Accordingly, it is a principal object of the present invention to provide new and valuable prepolymers of unsaturated heterocyclic compounds and substituted-styrenes. It is another object to provide a method for preparing such prepolymers which are stable at room temperature, have controllable viscosity and can be cured to form products having outstanding hardness, heat resistance and chemical resistance, particularly solvent resistance. It is a further to provide prepolymer compositions which are especially useful in preparing superior laminated products. Other objects will become apparent to one skilled in the art from the following disclosure and discussion.

These and other objects are accomplished by the prepolymers of the present invention which comprises (1) a prepolymer prepared by heating a compound containing at least one cyclic structure containing an ethylenic group adjacent to a heteroatom, and one other ethylenic group, and preferably a compound possessing a plurality of dihydropyran rings, in the presence of a salt of an inorganic acid, and (2) up to 50% by weight of the said prepolymer of a side-chain substituted styrene.

It will be appreciated that the substituted-styrene may be reacted with the unsaturated heterocyclic compound in the presence of the salt of the inorganic acid or the prepolymer of the unsaturated heterocyclic may be prepared first in the presence of the inorganic acid salt and then the substituted-styrene added to the prepolymer just before use, i.e., before application and curing.

It has been found that this curable prepolymer composition is stable at room temperature and can be subsequently heated to form the desirable cured product. Surprisingly, it has been found that the viscosity of the substituted-styrene modified prepolymer can be controlled by the temperature and length of heating, and by controlled heating and subsequent cooling one can obtain a prepolymer of varying viscosities. It has been further found that the resulting cured products have excellent heat resistance and hardness and good resistance to solvents and the like. These properties make the new prepolymer compositions ideal materials for preparation of laminated products needed in the missile and rocket industries.

The unsaturated compounds used in making the prepolymers comprise those compounds possessing at least one cyclic structure containing an ethylenic group adjacent to the heteroatom, and one other ethylenic group. By heteroatom is meant a polyvalent atom other than carbon, such as, for example, oxygen, nitrogen, sulfur, phosphorous, arsenic, antimony, tin, lead, silicon and the like. Cyclic groups which contain both the heteroatoms and the ethylenic group include among others, the dihydropyran, tetrahydropyridine, dihydrothiophene, dihydropyrrole, dihydrofuran, and the like rings and their substituted derivatives, such as, for example, their halogenated, alkylated alkoxy-substituted derivatives and the like.

The other ethylenic group present in the molecule can be contained in another cyclic structure of the above-noted composition or it can be contained in a straight chain group attached to the cyclic structure through an ether, ester, sulfur, or like linkage.

Examples of such compounds are those of the formula

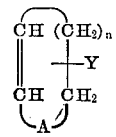

wherein A is a member of the group consisting of oxygen, sulfur, nitrogen, phosphorous, arsenic, antimony, tin, lead, silicon and germanium, $n$ is an integer of 1 or 2 and Y is an organic radical containing an ethylenic group which is attached to a carbon atom in the ring and is preferably one containing an ester, ether or amide linkage in addition to the ethylenic group.

Preferred compounds are those wherein there are two or more of the above-described cyclic structures joined through a linking group. The group joining the above-described heterocyclic rings may be of any type of polyvalent connecting radical. Examples of these radicals include the simple inorganic or organic radicals such as bivalent hydrocarbon radicals or hydrocarbon radicals containing other elements such oxygen, nitrogen, sulfur, phosphorous and the like, in the said radicals. The radicals may also be substituted with halogen atoms, ether, ester, mercaptan, urethane, amide, imide and the like radicals. The polyvalent connecting radicals may also be of a polymeric nature.

A preferred group of the above-described compounds may be exemplified by the following structural formula:

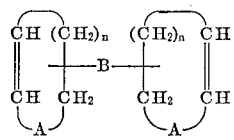

wherein A is a member of the group comprising oxygen, sulfur, nitrogen, phosphorous, arsenic, antimony, tin, lead, silicon and germanium, B is any organic or inorganic element or radical attached to carbon atoms, $n$ is an integer of at least 1 and preferably 1 or 2. Of special interest, are the compounds wherein A is oxygen, sulfur or nitrogen.

A particularly preferred group of the heterocyclic compounds include those represented by the following structural formula:

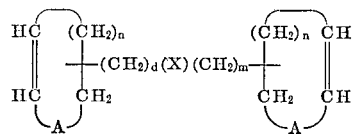

wherein A and $n$ are as described above, $d$ and $m$ are 0 to 6 and X is a member of the group comprising hydrocarbon radicals, —YX₁Y— radical (wherein $X_1$ is a bivalent hydrocarbon radical and Y is O, N or S), ether oxygen atom, sulfur atom, ester linkage, nitrogen atom, amide, imide, urethane linkage and the like.

Coming under special consideration, particularly because of the superior properties of the resulting cured products are the

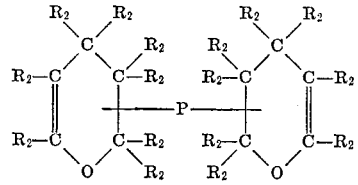

wherein $R_2$ is hydrogen, alkyl, alkoxy or halogen, P is a hydrocarbon radical or substituted hydrocarbon radical, such as one containing an ether oxygen, —S—, —SO—, —SO₂—, —SS—, ester, amide, imide, carbamyl, epoxide, or the like.

Examples of the above-described compounds include, among others, 3,4-dihydro-1,2-pyran-2-methyl-3,4-dihydro-1,2-pyran-2-carboxylate

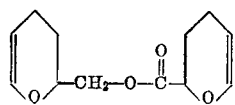

3,4-dihydro-1,2-pyran-2-methyl-2,3-dihydrothiophene-2-carboxylate

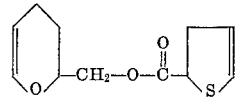

3,4-dihydro-1,2-pyran-2-methyl-N-methyl-1,2,3,4-tetrahydropyridine-2-carboxylate

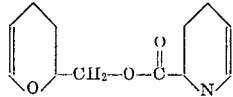

3,4-dihydro-1,2-pyran-2-methyl-N-methyl-2,3-dihydropyrrole-2-carboxylate

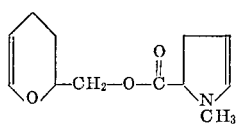

3,4-dihydro-1,2-pyran-2-methyl-2,3-dihydropyran-2-carboxylate

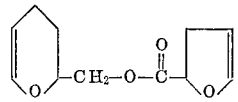

1,5-bis(3,4-dihydro-1,2-pyran-2-methoxy)pentane

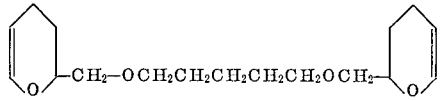

1,2,6-tris(3,4-dihydro-1,2-pyran-2-methoxy)hexane

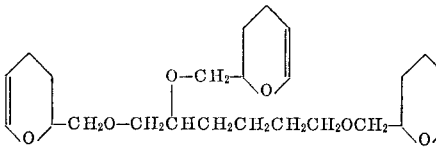

1,5-bis(3,4-dihydro-1,2-pyran-2-methylmercapto)pentane

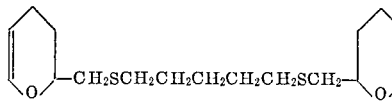

N-methyl-2,3-dihydropyrrole-2-methyl-N-methyl-1,2,3,4-tetrahydropyridine-2-carboxylate

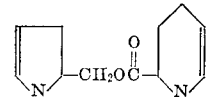

3,4-dihydro-2,5-dioctyl-1,2-pyran-2-butyl-3,4-dihydro-1,2-pyran-2-carboxylate

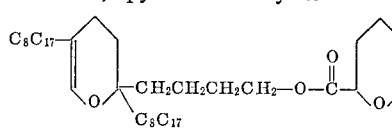

2,3-dihydrofuran-2-octyl-2,3-dihydrofuran-2-carboxylate

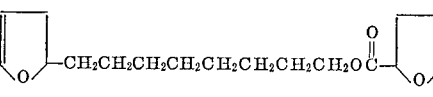

2,3-dihydrofuran-2-hexyl-2,3-dihydrothiophene-2-carboxylate

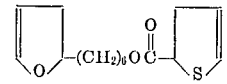

Other examples include compounds of the formulae:

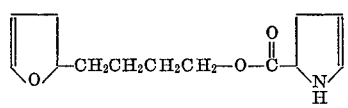
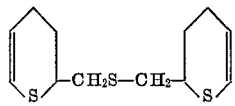
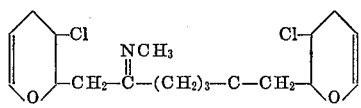
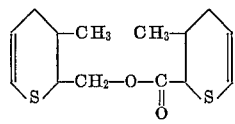
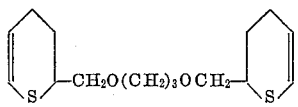
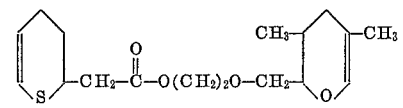
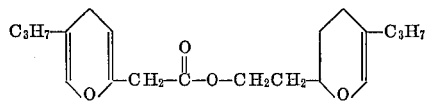

Other examples include compounds having more than 2 heterocyclic rings, such as

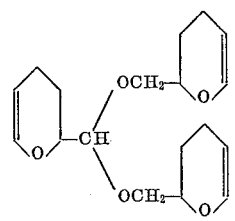
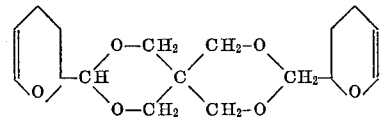
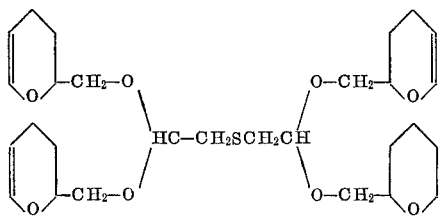
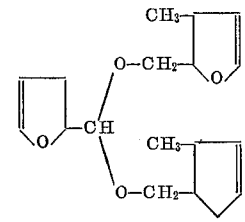

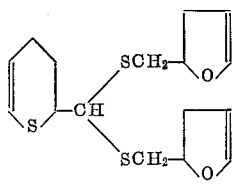

A valuable group include those of the formula

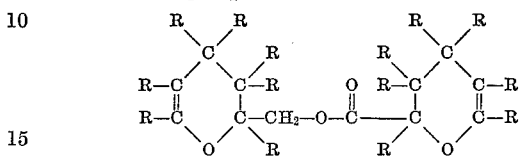

in which each R represents hydrogen or a hydrocarbon radical (and preferably an alkyl group). Examples of these compounds include, among others, 3,4-dihydro-1,2-pyran-2-methyl-3,4-dihydropyran-2-carboxylate,
4-butyl-3,4-dihydro-1,2-pyran-2-methyl-3,4-dihydropyran-2-carboxylate,
3,4-diethyl-3,4-dihydro-1,2-pyran-2-methyl-3,4-dihydropyran-2-carboxylate,
3,4-diisopropyl-3,4-dihydro-1,2-pyran-2-methyl-3,4-diisopropyl-3,4-dihydropyran-2-carboxylate,
4-hexyl-3,4-dihydro-1,2-pyran-2-methyl-3,4-diisopropyl-3,4-dihydropyran-2-carboxylate
4,5-di-tert-butyl-3,4-dihydropyran-2-methyl-4-hexyl-3,4-dihydropyran-2-carboxylate,
4,6-dioctyl-3,4-dihydropyran-2-methyl-4-octyl-3,4-dihydropyran-2-carboxylate,
2,5-didodecyl-3,4-dihydropyran-2-methyl-4-octyl-3,4-dihydropyran-2-carboxylate.

Other less preferred examples are those wherein the other ethylenic group is in a non-cyclic group, such as, for example, allyl ester of 3,4-dihydropyran-2-carboxylic acid, vinyl ester of 3,4-dihydropyran-2-carboxylic acid, methallyl ether of 3,4-dihydro - 1,2 - pyran-2-methanol, butenyl ester of 3,4-diisopropyl-3,4-dihydropyran-2-carboxylic acid, 2,4-hexadienyl ether of 4,6-dioctyl-3,4-dihydropyran-2-methanol, chloroallyl ether of 4-octyl-3,4-dihydropyran-2-ethanol, and the like.

The above-described compounds can be prepared by a variety of different methods. The esters of the heterocyclic acids and heterocyclic alcohols can, for example, be prepared by reacting a salt of the acid with a halide corresponding to the heterocyclic alcohol. The ethers can be obtained by reacting the alcohol with a halide of the heterocyclic compound in the presence of a usual catalyst. The amides may be prepared by reacting the heterocyclic amine with the desired heterocyclic acid in the presence of conventional catalysts. Alternatively, the esters may be prepared by reacting an aldehyde, such as the 3,4-dihydro-1,2-carboxyaldehyde with the catalyst, such as aluminum isopropoxide, so as to effect a Tishchenko reaction and formation of an ester group between two molecules of the aldehyde. This latter method is described in U.S. 2,537,921.

The other component of the present prepolymer compositions comprises the substituted-monovinyl aromatic compounds. Suitable alpha-substituted-monovinyl aromatic compounds have the structural formula:

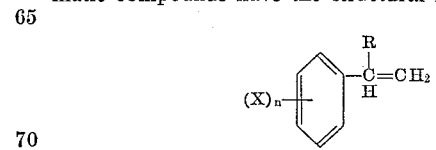

wherein R is an alkyl group containing from 1 to 5 carbon atoms, X is a non-reactive substituent selected from the group consisting of alkyl groups containing from 1 to 5 carbon atoms and halo-groups such as chloro and bromo, and $n$ is an integer from 0 to 5, and preferably either 0 or 1.

Preferred alpha-alkyl styrenes include, among others, alpha-methyl styrene, alpha-ethyl styrene, alpha-n-propyl styrene and alpha-isopropyl styrene. The alpha-alkyl styrenes may be additionally ring substituted with alkyl and/or halo-groups and include, among others, 2-(1-methyl vinyl)toluene, 3-(1-methyl vinyl)toluene, 4-(1-methyl vinyl)toluene, 2-(1-ethyl vinyl)toluene, 1-chloro-2-(1-methyl vinyl)benzene, 1-chloro-3-(1-methyl vinyl) benzene, and 1-chloro-2-(1-ethyl vinyl)benzene.

The comparable beta-alkyl-styrenes may also be utilized as desired although they are economically unattractive at present.

Especially preferred is alpha-methyl styrene because of its availability and the outstanding results obtained therefrom.

As noted hereinbefore, the prepolymers of the present invention may be prepared by either of two methods. One method comprises heating (1) from 50 to 99 parts by weight of a compound containing at least one cyclic structure containing an ethylenic group adjacent to a hetero atom and one other ethylenic group, and preferably a compound possessing a plurality of dihydropyran rings with (2) from 1 to 50 parts by weight of an alpha-substituted styrene in the presence of a salt of an inorganic acid, the anion portion of which contains at least two dissimilar elements and preferably an amine salt of said acids. A second method comprises first preparing (1) a prepolymer by a process which comprises heating a compound containing at least one cyclic structure containing an ethyleic group adjacent to a heteroatom, and one other ethylenic group, and preferably a compound possessing a plurality of dihydropyran rings, in the presence of a salt of an inorganic acid, the anion portion of which contains at least two dissimilar elements and preferably an amine salt of one of the aforementioned acids, then adding (2) an alpha-substituted styrene, and preferably an alpha-alkyl styrene, to said prepolymer. In general, preferred compositions range from about 75 to 99 parts of the unsaturated heterocyclic compound to about 1 to 25 parts of the alpha-alkyl styrene. Especially preferred amounts range from 80 to 95 parts of the unsaturated heterocyclic compound to 5 to 20 parts of the alpha-alkyl styrene.

The prepolymer is prepared in the presence of a salt of an inorganic acid, the anionic portion of which contains at least two dissimilar elements. One of the dissimilar elements is preferably non-metal, (e.g., as described in chapter 6 of Epheraim "Inorganic Chemistry" 1939 edition) such as boron, silicon, sulfur, nitrogen, selenium, tellurium, and phosphorus. One of the other dissimilar elements is preferably an element which contains two or more electrons in its outer orbit and thereby assume a negative charge such as oxygen, fluorine and chlorine.

Examples of the above-described acids include, among others, fluoboric acid, persulfuric acid, sulfuric acid, fluoberyllic acid, boric acid, hypochlorous acid, iodic acid, periodic acid, phosphoric acid, phosphorous acid, selenious acid, arsenous acid, telluric acid, fluosilicic acid, silicic acid, manganic acid, and the like.

Preferred acids are those of the general formula:

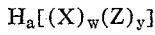

$$H_a[(X)_w(Z)_y]$$

wherein X is a non-metal having an atomic weight above 2, Z is an element which tends to gain from 1 to 2 electrons in its outer orbit, $w$ is an integer, $y$ is an integer greater than 1, and $a$ equals the valency of the radical $(X)_w(Z)_y$, such as sulfuric acid, fluoboric acid, fluosilicic acid, persulfuric acid, phosphoric acid, and the like.

Particularly preferred acids are those containing fluorine and especially fluoboric acid.

The cationic portion of the salt molecule may be a metal or non-metal and is preferably a nitrogen containing group such as an amine. Preferred amines to be used are those having a pKb value less than 9.5. Examples of the amines that might be used in making these salts include, piperidine, diethyl aniline, dimethyl aniline, morpholine, aniline and diethylene triamine, dimethyl amine, dibutyl amine, N,N-diethylpiperidine and the like and mixtures thereof.

Examples of the salts to be used in making the prepolymer compositions include, among others, diethyl aniline fluoboride, dimethyl aniline fluoborate, diethyl aniline boron trifluoride, morpholine sulfate, dimethyl aniline phosphate, piperidine fluoborate, methyl amine boron trifluoride, diethyl aniline borate, diethyl amine sulfate, butyl amine phosphate, diethyl aniline silicate, octyl amine phosphate, diethylaniline fluosilicate, diethylene triamine boron trifluoride, hexamethylene diamine fluoborate, allyl amine fluoborate, cyclohexylamine phosphate, diallyl amine phosphate, dioctyl fluosilicate and the like and mixtures thereof.

In preparing the prepolymer compositions of the present invention, one may mix one or more of the above-described unsaturated monomers with or without one or more alpha-substituted styrenes in the presence of one or more of the above-described salts and then heat the resulting mixture until the desired viscosity is obtained.

The amount of the salt employed in the process may vary over a wide range. In general, the amount of the salt will vary from about 0.1% to about 5% by weight of the unsaturated heterocyclic monomer. Particularly preferred amounts of the salt vary from about 0.5% to 1.5% by weight of the unsaturated heterocyclic monomer.

The temperature employed in the heating will vary depending upon the catalyst and the desired viscosity. In general temperatures employed may vary from about 40° C. to about 125° C. Preferred temperatures range from about 75° C. to 100° C. After the desired viscosity is obtained the mixture should then be cooled to about room temperature to prevent further increase in the viscosity.

The prepolymer compositions formed by the above process may be utilized for a great variety of different applications. They may be utilized to form various types of coating and impregnating compositions or in making cast or molded plastic articles. The compositions are particularly suited for use in making laminated products as they have ability to adhere to the substrate and to be cured under conventional limited conditions to form hard heat resistant products having good chemical resistance.

In making the laminates one may apply as by dipping, painting, spraying or padding the desired prepolymer composition onto the substrate, removing any excess material and then subjecting the resulting product to the desired pressure and temperature to effect a cure. The material treated in this manner may be regular sheets of cloth, paper, or wood and the like, or may be strands or fibers which may be alternately woven or wound into the desired composite structure. The new compositions are particularly suited for use in the filament winding technique in that they can be easily applied to the glass strands and treated material wound on the mandrel to form the desired laminated product. The product is then subjected to conventional pressures and temperatures for curing, e.g. 125° C. to 300° C. and pressure 100 p.s.i. to 2000 p.s.i.

To illustrate the manner in which the invention may be carried out the following examples are given. It is to be understood, however, that the examples are for the purpose of illustration and the invention is not to be regarded as limited to any of the specific conditions or reactants recited therein. Unless otherwise specified, parts described in the examples are parts by weight.

EXAMPLE I

This example illustrates the preparation of a prepolymer composition from 3,4-dihydro-1,2-pyran-2-methyl-3,4-dihydro-1,2-pyran-2-carboxylate and alpha-methyl styrene in the absence of N,N-diethyl aniline fluoborate (prepared from diethyl aniline and fluoboric acid).

192.5 parts of the above-described pyran carboxylate was mixed with 27.5 parts of alpha-methyl styrene and 2.2 parts of N,N-diethyl aniline fluoborate and the mixture was stirred at room temperature and allowed to stand. The composition remained stable at room temperature with no change in viscosity for over a period of 6 weeks. The solution was then heated at 100° C. and a slow increase in viscosity took place. After 90 minutes of heating, the viscosity was 101 poises at 25° C. On cooling to room temperature the polymerization stopped and the viscosity remained at 101 poises.

Castings were prepared and cured for 4 hours at 100° C. and 4 hours at 150° C. The castings had the following properties:

Tensile strength, p.s.i. _____ 6,868
Elongation, percent _____ 1.96
Tensile modulus, p.s.i. _____ 411,000
Flexural strength, p.s.i. _____ 15,600
Flexural modulus, p.s.i. _____ 482,000
Compressive strength, p.s.i. _____ 23,720
Compressive modulus, p.s.i. _____ 363,000
Izod impact, ft.-lbs./inch _____ 0.29
Heat distortion, ° C. _____ 179

Percent increase in weight after a soaking cycle of:

|  | 24 hours | 1 week | 1 month |
| --- | --- | --- | --- |
| Water | +0.28 | +0.89 | +1.78 |
| Acetone | +0.10 | +0.68 | +1.92 |
| Benzene | +0.01 | +0.04 | +0.24 |
| 10% NaOH | +0.15 | +0.36 | +0.35 |
| 10% H₂SO₄ | +0.25 | +0.81 | +1.62 |

EXAMPLE II

The procedure of Example I is substantially repeated wherein the salt employed is one of the following: diethyl aniline fluoborate, diethyl aniline boron trifluoride, and morpholine fluoborate. Related results and physical properties are obtained in each instance.

EXAMPLE III

The procedure of Example I is essentially repeated wherein the heterocyclic compound employed is replaced with each of the following: N-methyl-2,3-dihydropyrrole-2-methyl-N-methyl-1,2,3,4-tetrahydropyridine-2-carboxylate; 3,4-dihydro-2H-pyran-methyl-N-methyl-1,2,3,4-tetrahydro-pyridine-2-carboxylate; 3,4-dihydro-2H-pyran-2-methyl-2,3-dihydrothiopene-2-carboxylate and 3,4-dihydro-2H-pyran-2-methyl-2,3-dihydrofuran-2-carboxylate. Related results are obtained.

EXAMPLE IV

The procedure of Example I is essentially repeated wherein the substituted styrene is alpha-ethyl styrene, 2-(1-methyl vinyl)toluene or 1-chloro-2-(1-methyl vinyl) benzene. Related results are obtained in each instance.

EXAMPLE V 209 parts of 3,4-dihydro-1,2-pyran-2-methyl-3,4-dihydro-1,2-pyran-2-carboxylate were mixed with 11 parts of alpha-methyl styrene and 2.2 parts of N,N-diethyl aniline fluoborate and heated to 100° C. for 90 minutes. On cooling to room temperature the viscosity was 195 poises.

Castings prepared and cured for 4 hours at 150° C. had the following properties:

Tensile strength, p.s.i. _____ 8,250
Elongation, percent _____ 2.68
Tensile modulus, p.s.i. _____ 375,000
Flexural strength, p.s.i. _____ 16,350
Flexural modulus, p.s.i. _____ 494,000
Compressive strength, p.s.i. _____ 23,590
Compressive modulus, p.s.i. _____ 347,000
Izod impact, ft.-lbs./inch _____ 0.27
Heat distortion, ° C. _____ 193

Percent increase in weight after soaking cycle of:

|  | 24 hours | 1 week | 1 month |
| --- | --- | --- | --- |
| Water | +0.31 | +0.94 | +2.06 |
| Acetone | −0.04 | +0.08 | +0.54 |
| Benzene | −0.04 | −0.01 | +0.10 |
| 10% NaOH | −0.03 | +0.30 | +0.69 |
| 10% H₂SO₄ | +0.28 | +0.88 | +1.92 |

EXAMPLE VI 198 parts of 3,4-dihydro-1,2-pyran-2-methyl-3,4-dihydro-1,2-pyran-2-carboxylate were mixed with 22 parts of alpha-methyl styrene and 2.2 parts of N,N-diethyl aniline fluoborate. This mixture was heated at 100° C. for 90 minutes. The viscosity was 132 poises.

Castings were prepared and cured for 4 hours at 150° C. The castings had the following properties:

Tensile strength, p.s.i. _____ 9,570
Tensile modulus, p.s.i. _____ 380,000
Elongation, percent _____ 4.12
Flexural strength, p.s.i. _____ 14,950
Flexural modulus, p.s.i. _____ 458,000
Compressive strength, p.s.i. _____ 28,440
Compressive modulus, p.s.i. _____ 343,000
Izod impact, ft.-lbs./inch _____ 0.28
Heat distortion, ° C. _____ 174

Percent increase in weight after soaking cycle of:

|  | 24 hours | 1 week | 1 month |
| --- | --- | --- | --- |
| Water | +0.26 | +0.90 | +1.95 |
| Acetone | +0.11 | +0.66 | +2.13 |
| Benzene | −0.04 | −0.09 | +0.08 |
| 10% NaOH | −0.15 | +0.06 | +0.34 |
| 10% H₂SO₄ | +0.32 | +0.86 | +1.82 |

EXAMPLE VII 187 parts of 3,4-dihydro-1,2-pyran-2-methyl-3,4-dihydro-1,2-pyran-2-carboxylate were mixed with 33 parts of alpha-methyl styrene and 2.2 parts of N,N-diethyl aniline fluoborate.

This mixture was bodied up at a temperature of 100° C. for 90 minutes. Viscosity was 70 poises.

Castings were prepared from this polymer and cured for 4 hours at 150° C. They had the following properties:

Tensile strength, p.s.i. _____ 8,780
Tensile modulus, p.s.i. _____ 339,000
Elongation, percent _____ 4.17
Flexural strength, p.s.i. _____ 14,190
Flexural modulus, p.s.i. _____ 439,000
Compressive strength, p.s.i. _____ 27,200
Compressive modulus, p.s.i. _____ 324,000
Izod impact, ft.-lbs./inch _____ 0.26
Heat distortion, ° C. _____ 141

Percent increase in weight after soaking cycle of:

|  | 24 hours | 1 week | 1 month |
| --- | --- | --- | --- |
| Water | +0.28 | +0.82 | +1.69 |
| Acetone | +0.57 | +2.05 | +5.46 |
| Benzene | −0.03 | +0.04 | +0.19 |
| 10% NaOH | +0.03 | +0.20 | +3.21 |
| 10% H₂SO₄ | +0.28 | +0.76 | +1.57 |

EXAMPLE VIII 176 parts of 3,4-dihydro-1,2-pyran-2-methyl-3,4-dihydro-1,2-pyran-2-carboxylate were mixed with 44 parts of alpha-methyl styrene and 2.2 parts of N,N-diethyl aniline fluoborate and heated to 100° C. for 90 minutes. The resulting polymer had a viscosity of 8.3 poises at 25° C.

Castings were prepared from this polymer and cured for 4 hours at 150° C. They had the following properties:

| | |
|---|---:|
| Tensile strength, p.s.i. | 7,820 |
| Tensile modulus, p.s.i. | 327,000 |
| Elongation, percent | 5.24 |
| Flexural strength, p.s.i. | 14,620 |
| Flexural modulus, p.s.i. | 412,000 |
| Compressive strength, p.s.i. | 19,970 |
| Compressive modulus, p.s.i. | 323,000 |
| Izod impact, ft.-lbs./inch | 0.28 |
| Heat distortion, ° C. | 92 |

Percent increase in weight after a soaking cycle of:

| | 24 hours | 1 week | 1 month |
|---|---|---|---|
| Water | +0.24 | +0.70 | +1.39 |
| Acetone | +1.62 | +5.59 | +12.91 |
| Benzene | −0.02 | +0.08 | +0.42 |
| 10% NaOH | −0.05 | +0.08 | +0.03 |
| 10% $H_2SO_4$ | +0.23 | +0.65 | +1.28 |

EXAMPLE IX 500 parts of 3,4-dihydro-1,2-pyran-2-methyl-3,4-dihydro-1,2-pyran-2-carboxylate was mixed with 7.5 parts of N,N-diethyl aniline fluoborate and heated for 35 minutes at 100° C., then 15 minutes at 90° C. The refractive index of the prepolymer:

$$n_D^{25} = 1.5145$$

This bodied prepolymer was mixed with 88 parts of alpha-methyl styrene. The viscosity of the mixture was 26 poises at 25° C.

Glass cloth laminates (5 inches x 9 inches x 14 ply) were readily prepared from this resin. They were cured for 4 hours at 150° C. Resin content was 28%. They had the following properties.

Flexural strength:
  Tested at room temperature (20° C.)—
    P.s.i. _____ 71,171
    Modulus × $10^6$ _____ 3.46
  Tested at 150° C.—
    P.s.i. _____ 19,100
    Modulus × $10^6$ _____ 2.55
  Tested at 20° C. after 24 hrs. in boiling water—
    P.s.i. _____ 21,600
    Modulus × $10^6$ _____ 2.49
    Percent wt. change _____ +0.90
  Tested at 20° C. after 30 days in water—
    P.s.i. _____ 43,400
    Modulus × $10^6$ _____ 3.33
    Percent wt. change _____ +0.87
  Tested at 20° C. after 30 days in acetone—
    P.s.i. _____ 29,900
    Modulus × $10^6$ _____ 2.65
    Percent wt. change _____ +2.45

I claim as my invention:

1. A composition stable at room temperature comprising a mixture of (1) from 50 to 99 parts by weight of 3,4-dihydro-1,2-pyran-2-methyl-3,4-dihydro-1,2-pyran-2-carboxylate, (2) from 1 to 50 parts by weight of alpha-methyl styrene and from 0.1 to 5% by weight of (1) of an amine salt of a fluoboric acid.

2. A composition as in claim 1 wherein the amine salt is diethylaniline fluoborate.

3. A process for making prepolymer compositions which comprises heating at a temperature from about 40° C. to about 125° C., (1) from 50 to 99 parts by weight of a compound containing at least one cyclic structure containing an ethylenic group adjacent to a heteroatom selected from the group consisting of oxygen, sulfur and nitrogen, and one other ethylenic group, (2) from 0.1 to 5% by weight of (1) of an amine salt of an inorganic acid selected from the group consisting of sulfuric acid, fluoboric acid, fluosilic acid, persulfuric acid and phosphoric acid and (3) from 1 to 50 parts by weight of a chain-substituted styrene, said heating being sufficient to effect the desired increase in viscosity without gelling the mixture.

4. A process for making a curable prepolymer composition which comprises heating at a temperature up to 110° C. so as to effect an increase in viscosity (1) from 50 to 99 parts by weight of a compound containing a plurality of

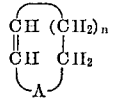

groups joined together at the carbon atom adjacent to the heteroatom by a polyvalent connecting group selected from the group consisting of hydrocarbon radicals and substituted hydrocarbon radicals wherein the substituents are selected from the group consisting of ether oxygen, —S—, —SO—, —$SO_2$—, —SS—, ester, amide, imide, carbamyl and epoxide groups, the $n$ in said formula being 1 to 2 and A being a heteroatom selected from the group consisting of oxygen, sulfur, and nitrogen, (2) from 0.1% to 5% by weight of (1) of a salt of an amine and an inorganic acid and (3) from 1 to 50 parts by weight of an alpha-alkyl styrene.

5. A process as in claim 4 wherein the heterocyclic compound has the structure

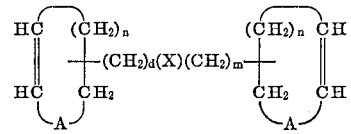

wherein A is a member of the group consisting of oxygen, sulfur and nitrogen, X is selected from the group consisting of

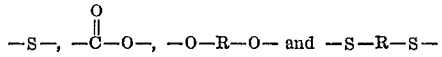

wherein R is a hydrocarbon radical, $n$ is an integer of 1 to 2 and $d$ and $m$ are integers of 0 to 2.

6. A process as in claim 4 wherein the salt is a salt of an amine having a pKb value less than 9.5.

7. A process as in claim 4 wherein the salt is a dialkyl aniline fluoborate.

8. A process as in claim 4 wherein the heterocyclic compound is 3,4-dihydro-1,2-pyran-2-methyl-3,4-dihydro-1,2-pyran-2-carboxylate.

9. A process for forming a prepolymer composition which is stable at room temperature which comprises heating (1) from 80 to 99 parts of a compound possessing a plurality of 3,4-dihydro-1,2-pyran rings with (2) from 1 to 20 parts by weight of an alpha-alkyl styrene in the presence of 0.1% to 5% by weight of the compound of (1) of diethylaniline fluoborate at a temperature below about 110° C. to effect the desired increase in viscosity and then cooling the mixture to room temperature.

10. A process for forming a prepolymer composition which is stable at room temperature which comprises heating (1) from 80 to 99 parts by weight of 3,4-dihydro-1,2-pyran-2-methyl-3,4-dihydro-1,2-pyran-2-carboxylate with (2) from 1 to 20 parts by weight of alpha-methyl styrene in the presence of 0.1% to 5% by weight of the carboxylate of diethylaniline fluoborate at a temperature below about 110° C. to effect the desired increase in viscosity and then cooling the mixture to room temperature.

11. A composition stable at room temperature which can be converted on heating to form a cured product comprising a mixture of (1) from 50 to 99 parts by weight of a compound of the formula:

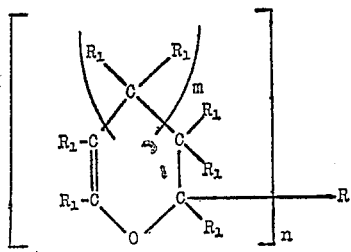

wherein R is a polyvalent connecting group selected from the group consisting of hydrocarbon radicals and substituted hydrocarbon radicals wherein the substituents are selected from the group consisting of ether oxygen, —S—, —SO—, —SO$_2$—, —SS—, ester, amide, imide, carbamyl and epoxide groups, R$_1$ is hydrogen or an alkyl radical, n is an integer 2, 3 or 4, and m is an integer of 0 or 1;
(2) from 1 to 50 parts by weight of an alpha-alkyl styrene, and
(3) from 0.1% to 5.0% by weight of compound (1) of an amine salt of an inorganic acid of the general formula:

$$Ha[(X)_w(Z)_y]$$

wherein X is oxygen, fluorine, or chlorine; Z is boron, silicon, sulfur, nitrogen, selenium, tellurium, or phosphorous; w is an integer, y is an integer greater than 1 and a equals the valency of the radical $$[(X)_w(Z)_y]$$

References Cited
UNITED STATES PATENTS

| | | | |
|---|---|---|---|
| 3,232,901 | 2/1966 | Holm et al. | 260—30.4 |
| 3,252,946 | 5/1966 | Holm | 260—78.3 |
| 3,285,892 | 11/1966 | MacKenzie et al. | 260—85.7 |
| 3,306,887 | 2/1967 | Holm et al. | 260—88.3 |
| 3,318,846 | 5/1967 | Smith et al. | 260—47 |
| 3,336,265 | 8/1967 | Palm et al. | 260—78.3 |
| 3,345,345 | 10/1967 | Holm | 260—79-3 |
| 3,373,169 | 3/1968 | Cherdron et al. | 260—343.9 |

JOSEPH L. SCHOFER, *Primary Examiner.*

J. C. HAIGHT, *Assistant Examiner.*

U.S. Cl. X.R.

260—88.3